United States Patent
Jacoby et al.

(10) Patent No.: US 9,826,029 B2
(45) Date of Patent: Nov. 21, 2017

(54) INTELLIGENT QUALITY OF SERVICE FOR REPLICATION

(71) Applicant: Dell Products, LP, Round Rock, TX (US)

(72) Inventors: Robert B. Jacoby, Merrimack, NH (US); Kenneth Paul Boyd, Tyngsboro, MA (US); Carlos Reyes, Nashua, NH (US)

(73) Assignee: Dell Products, LP, Round Rock, TX (US)

(*) Notice: Subject to any disclaimer, the term of this patent is extended or adjusted under 35 U.S.C. 154(b) by 290 days.

(21) Appl. No.: 14/478,107

(22) Filed: Sep. 5, 2014

(65) Prior Publication Data
US 2016/0072880 A1    Mar. 10, 2016

(51) Int. Cl.
*H04L 29/08* (2006.01)
*H04L 12/24* (2006.01)
*H04L 12/26* (2006.01)

(52) U.S. Cl.
CPC ...... *H04L 67/1008* (2013.01); *H04L 41/0883* (2013.01); *H04L 41/0896* (2013.01); *H04L 67/1095* (2013.01); *H04L 67/1097* (2013.01); *H04L 67/322* (2013.01); *H04L 43/06* (2013.01); *H04L 43/0876* (2013.01)

(58) Field of Classification Search
None
See application file for complete search history.

(56) References Cited

U.S. PATENT DOCUMENTS

| 8,793,334 B1* | 7/2014 | Bathija | H04L 67/1097 707/821 |
| 2004/0003087 A1* | 1/2004 | Chambliss | G06F 11/1076 709/226 |
| 2005/0015644 A1* | 1/2005 | Chu | H04L 69/329 714/4.1 |

(Continued)

FOREIGN PATENT DOCUMENTS

KR    20060055195 A  *  5/2006

OTHER PUBLICATIONS

Compellent Technologies, "Compellent Source Book, Remote Instant Replay, Thin Replication" Jul. 9, 2011, pp. 1-13.*

(Continued)

*Primary Examiner* — Nicholas Taylor
*Assistant Examiner* — Christopher B Robinson
(74) *Attorney, Agent, or Firm* — Hamilton, Brook, Smith & Reynolds, P.C.

(57) ABSTRACT

The present invention is directed to a method and information handling system (IHS) for estimating bandwidth and providing one or more Quality of Service (QoS) parameters between a first set of one or more storage devices and at least one other set of one or more storage devices. The method comprises the following, for a given set of the at least one other set of one or more storage devices. The method creates a given temporary volume associated with the given set. The method sends a given sequential workload of actual traffic between the first set and the given set. The method estimates, based upon the results of sending the given sequential workload of actual traffic, the one or more Quality of Service (QoS) parameters for the given set.

18 Claims, 6 Drawing Sheets

(56) References Cited

U.S. PATENT DOCUMENTS

| | | | | |
|---|---|---|---|---|
| 2005/0220035 | A1* | 10/2005 | Ling | H04L 41/5012 370/252 |
| 2005/0281288 | A1* | 12/2005 | Banerjee | H04L 47/10 370/477 |
| 2006/0259727 | A1* | 11/2006 | Thomas | G06F 3/0607 711/165 |
| 2013/0007234 | A1* | 1/2013 | Bartfai-Walcott | H04L 47/2433 709/223 |
| 2014/0047126 | A1* | 2/2014 | Callaway | H04L 47/10 709/233 |
| 2014/0123133 | A1* | 5/2014 | Luxenberg | H04L 67/322 718/1 |
| 2014/0269292 | A1* | 9/2014 | Kalkunte | H04L 47/215 370/232 |

OTHER PUBLICATIONS

Compellent Technologies, "Compellent Source Book," 13 pages, Jul. 9, 2011. Retrieved on Aug. 12, 2014 from the Internet URL: http://www.davenportgroup.com/_asset/dmz4mt/Compellent_Remote_Instant_Replay_Sourcebook.pdf.

Compellent Technologies, "Remote Instant Replay Storage Center/Datasheet," 6 pages, Feb. 19, 2009. Retrieved on Aug. 13, 2014 from the Internet URL: http://www.scaledatacom.com/compellent/remote.pdf.

Austin, J., "EMC Avamar Replication Guide: Sizing Your Bandwidth Properly for Offsite Backup," 2 pages, Nov. 5, 2009. Retrieved on Aug. 12, 2014 from the Internet URL: http://www.integrateddatastorage.com/blog/2009/11/05/emc-avamar-replication-guide-sizing-your-bandwidth-properly-for-offsite-backup/.

Alapati, et al., "SnapMirror Async Overview and Best Practices Guide," TR 3446, Version 3.3, 63 pages, Sep. 2010. Retrieved on Aug. 12, 2014 from the Internet URL: http://www.contourds.com/uploads/file/SnapMirror%20Best%20Practices-tr-3446(2).pdf.

Braasch, D., "Dell Compellent Enterprise Manager, Version 6.2, Administrator's Guide," 360 pages, Aug. 2012. Retrieved on Aug. 12, 2014 from the Internet URL: http://davidbraasch.files.wordpress.com/2012/12/680-017-017.pdf.

* cited by examiner

FIG. 2B-I

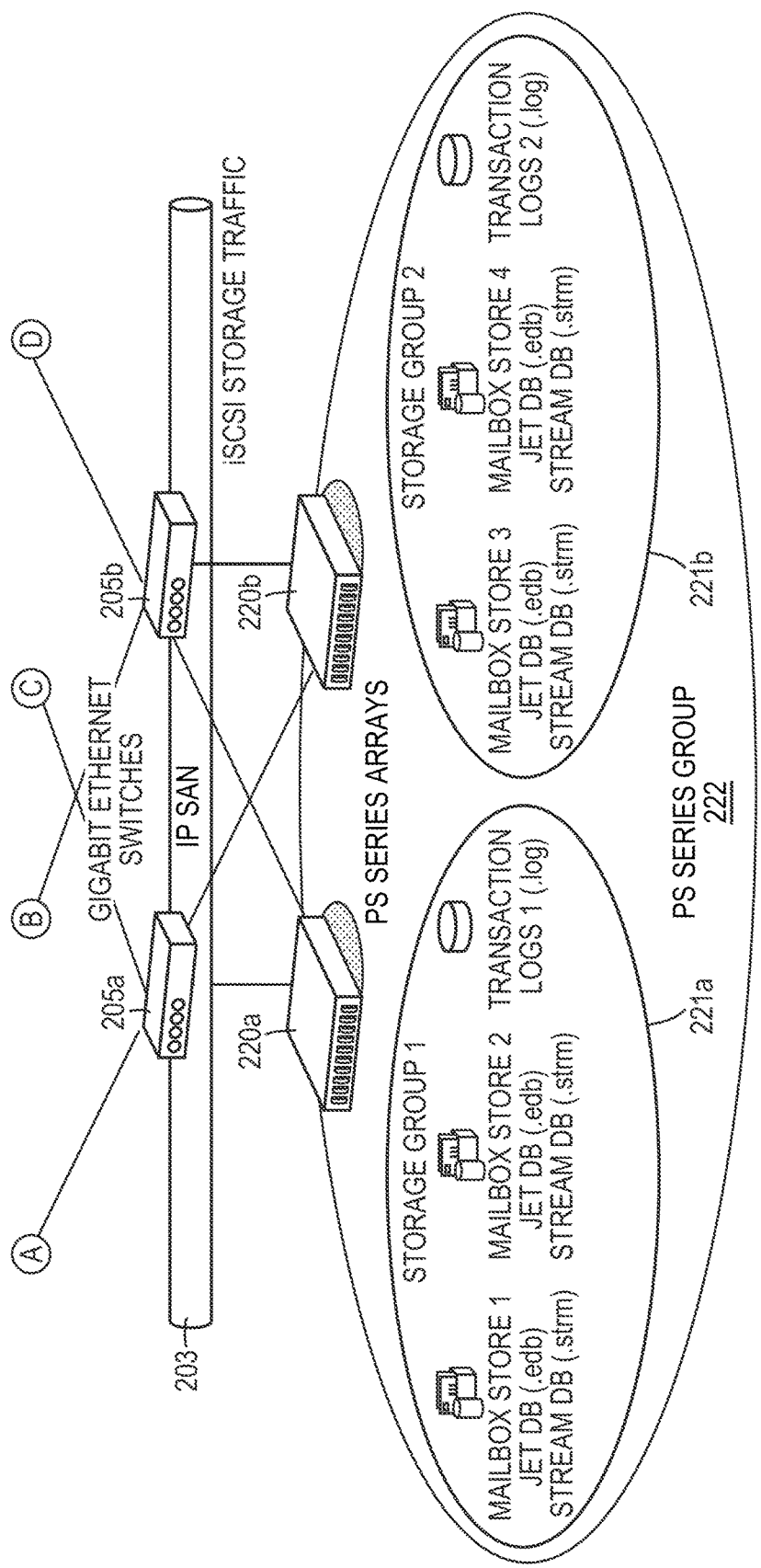
FIG. 2B-II

INTELLIGENT QUALITY OF SERVICE FOR REPLICATION

BACKGROUND OF THE INVENTION

The increased use of technology and computers has generated a corresponding increase in digital data. This ever-increasing digital data requires a corresponding ever-increasing amount of storage space.

In addition, disaster recovery is a concern for today's storage devices. There is a need to protect against inadvertent deletion of data from storage devices, damage from computer viruses, and site disasters. Replication of data provides a solution to disaster recovery because it enables a user to back-up data by copying data across multiple sites and/or groups.

In existing approaches, during replication, storage devices may consume the available bandwidth between the replica partners. If customers are not using a dedicated link for replication, such saturation may adversely affect the performance of other applications.

SUMMARY OF THE INVENTION

Thus, an efficient and reliable method for estimating bandwidth and providing one or more Quality of Service (QoS) parameters between sets of storage devices in a storage area network is presented. The present invention is directed to a method and corresponding apparatus for estimating bandwidth and providing QoS parameters between sets of storage devices in a storage area network.

An embodiment of the computer-implemented method of the present invention begins by estimating bandwidth and providing one or more Quality of Service (QoS) parameters between a first set of one or more storage devices and at least one other set of one or more storage devices. The method comprises the following, for a given set of the at least one other set of one or more storage devices. The method may create a given temporary volume associated with the given set. A temporary volume (and/or logical disk and/or virtual disk) may include a logical disk (and/or device) that provides a section of usable storage capacity on one or more storage devices. The method may send a given sequential workload of actual traffic between the first set and the given set. The method may estimate, based upon the results of sending the given sequential workload of actual traffic, the one or more Quality of Service (QoS) parameters for the given set.

Another embodiment of the method of the present invention may include reporting the one or more QoS parameters to a user. Another embodiment of the method of the present invention may include enabling the user to modify the one or more QoS parameters and controlling a data flow between the first set and the given set. The data flow may be associated with the one or more QoS parameters. Another embodiment of the method of the present invention may include copying given data stored at the first set to the given set along the data flow.

In yet another embodiment of the method of the present invention, the one or more QoS parameters for the given set may be different from one or more QoS parameters from at least one other given set of the at least one set of one or more storage devices. In another embodiment of the method of the present invention, the actual traffic sent between the first set and the given set may originate from the first set. In another embodiment of the method of the present invention, the at least one set of one or more storage devices may comprise at least one set of a plurality of storage devices. In another embodiment of the method of the present invention, the at least one set of one or more storage devices may comprise a plurality of sets of one or more storage devices. In another embodiment of the method of the present invention, the at least one set of one or more storage devices may comprise a plurality of sets of a plurality of storage devices.

A further embodiment of the present invention is directed to an Information Handling System (IHS). An embodiment of the IHS comprises a computing module configured to create a given temporary volume associated with a given set of at least one set of one or more storage devices. The computing module may be further configured to send a given sequential workload of actual traffic between a first set of one or more storage devices and the given set. The computing module may be further configured to estimate, based upon the results of sending the given sequential workload of actual traffic, one or more QoS parameters for the given set.

An embodiment of the IHS may include a reporting module configured to report the one or more QoS parameters to a user. Another embodiment of the IHS may include a data module configured to enabling the user to modify the one or more QoS parameters. The data module may be further configured to control a data flow between the first set and the given set. The data flow may be associated with the one or more QoS parameters.

In an embodiment of the IHS, the data module may be further configured to copy given data stored at the first set to the given set along the data flow. In another embodiment of the IHS, the one or more QoS parameters for the given set may be different from the one or more QoS parameters from another given set of the at least one set of one or more storage devices.

In another embodiment of the IHS, the actual traffic sent between the first set and the given set may originate from the first set. In yet another embodiment of the IHS, the at least one set of one or more storage devices may comprise at least one set of a plurality of storage devices. In yet another embodiment of the IHS, the at least one set of one or more storage devices may comprise a plurality of sets of one or more of storage devices. In another embodiment of the IHS, the at least one set of one or more storage devices may comprise a plurality of sets of a plurality of storage devices.

An alternative embodiment of the present invention is directed to a non-transitory computer readable medium having stored thereon a sequence of instructions which, when loaded and executed by a processor coupled to an apparatus, causes the apparatus to: create a given temporary volume associated with a given set of at least one set of one or more storage devices; send a given sequential workload of actual traffic between a first set of one or more storage devices and the given set; and estimate, based upon the results of sending the given sequential workload of actual traffic, one or more QoS parameters for the given set.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Replication may include copying (and/or backing up) files from a first set of storage devices to one or more other sets of storage devices. A first set of one or more storage devices, also known as a Peer Storage (PS) series array, or a replication partner, may replicate (and/or copy, and/or backup) its data to (and/or from) at least one other set of one or more storage devices, also known as another PS series array or another replication partner. The replication partners (sets of storage devices) may be located at the same physical location or at a different physical location.

The present invention allows a user to set limits on the Quality of Service (QoS) parameters, such as, but not limited to, bandwidth and/or throughput, between the replica partners. The present invention is directed to a method for estimating bandwidth (and providing QoS) between two or more replica partners. The present invention may be used to prevent a replication procedure from utilizing all of the bandwidth of a shared communication link. The proposed method creates a temporary volume on at least one partner, sends a large sequential workload of actual traffic between the partners, collects the actual traffic results, and uses these actual traffic results to formulate a more accurate estimate of traffic bandwidth than in existing approaches.

By contrast with existing approaches, in one embodiment, the present invention estimates bandwidth based on actual bandwidth, not just predicted bandwidth. For example, existing approaches such as NETAPP SNAPMIRROR, COMPELLENT CENTER REMOTE INSTANT REPLAY, and EMC AVIMAR REPLICATION are deficient at least because they fail to estimate bandwidth based on actual bandwidth. The present invention remedies these deficiencies by performing an actual "test" using actual bandwidth, and using the actual results to provide an improved estimation of bandwidth. Also, by contrast with existing approaches, in one embodiment, in a scenario of three or more replication partners, different bandwidths (QoS) may be set between different sets of partners, and sets of partners may share a common partner (e.g., bandwidth and/or QoS may be set between partners).

Figure 1:
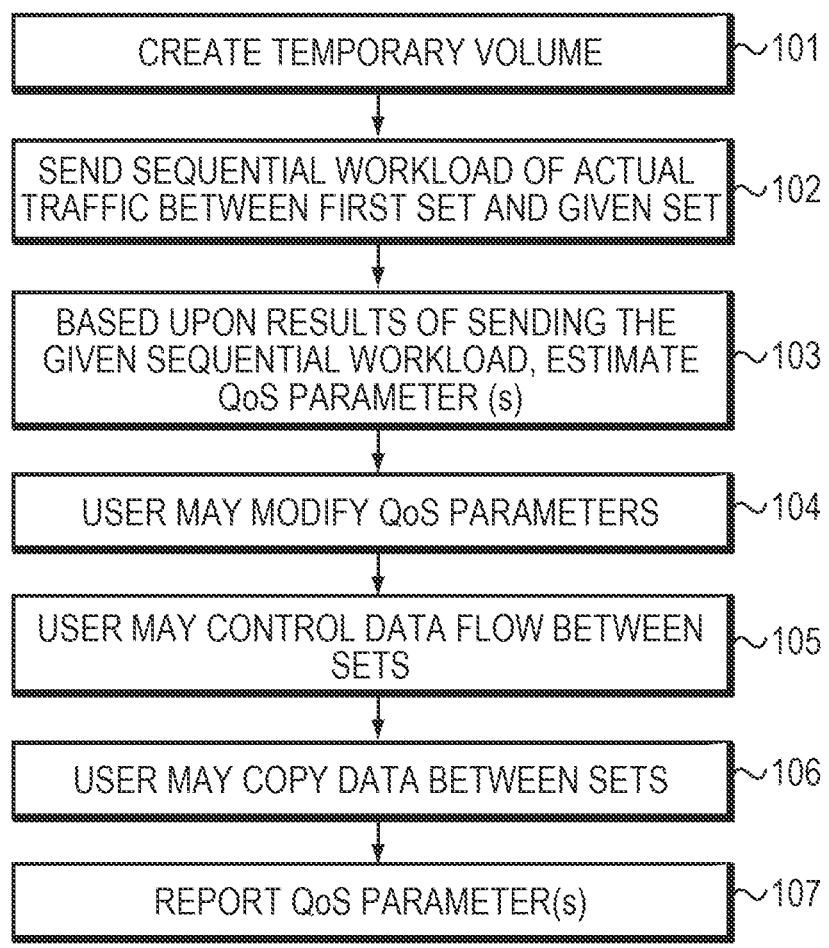
FIG. 1 is a flowchart of a method of estimating and controlling QoS parameters in a storage area network, according to an embodiment of the invention.

Thus, as illustrated in FIG. 1, an efficient and reliable method 100 for estimating bandwidth and providing one or more Quality of Service (QoS) parameters is presented. The present invention estimates bandwidth and provides one or more Quality of Service (QoS) parameters between a first set of one or more storage devices and at least one other set of one or more storage devices. The method comprises the following, for a given set of the at least one other set of one or more storage devices. First, the method may create a given temporary volume associated with the given set 101. A temporary volume (and/or logical disk and/or virtual disk) may include a logical disk (and/or device) that provides a section of usable storage capacity on one or more storage devices. Next, the method may send 102 a given sequential workload of actual traffic between the first set and the given set. Further, the method may estimate 103, based upon the results of sending the given sequential workload of actual traffic, the one or more Quality of Service (QoS) parameters for the given set.

Optionally, the method may enable the user to modify the one or more QoS parameters 104 and enable the user to control a data flow between the first set and the given set 105. The data flow may be associated with the one or more QoS parameters. The method may copy 106 given data stored at the first set to the given set along the data flow. Optionally, the method may report 107 the one or more QoS parameters to a user.

In one embodiment, the one or more QoS parameters for the given set may be different from one or more QoS parameters from at least one other given set of the at least one set of one or more storage devices. In another embodiment, the actual traffic sent between the first set and the given set may originate from the first set. In another embodiment, the at least one set of one or more storage devices may comprise at least one set of a plurality of storage devices. In another embodiment, the at least one set of one or more storage devices may comprise a plurality of sets of one or more storage devices. In another embodiment, the at least one set of one or more storage devices may comprise a plurality of sets of a plurality of storage devices.

Figure 2A:
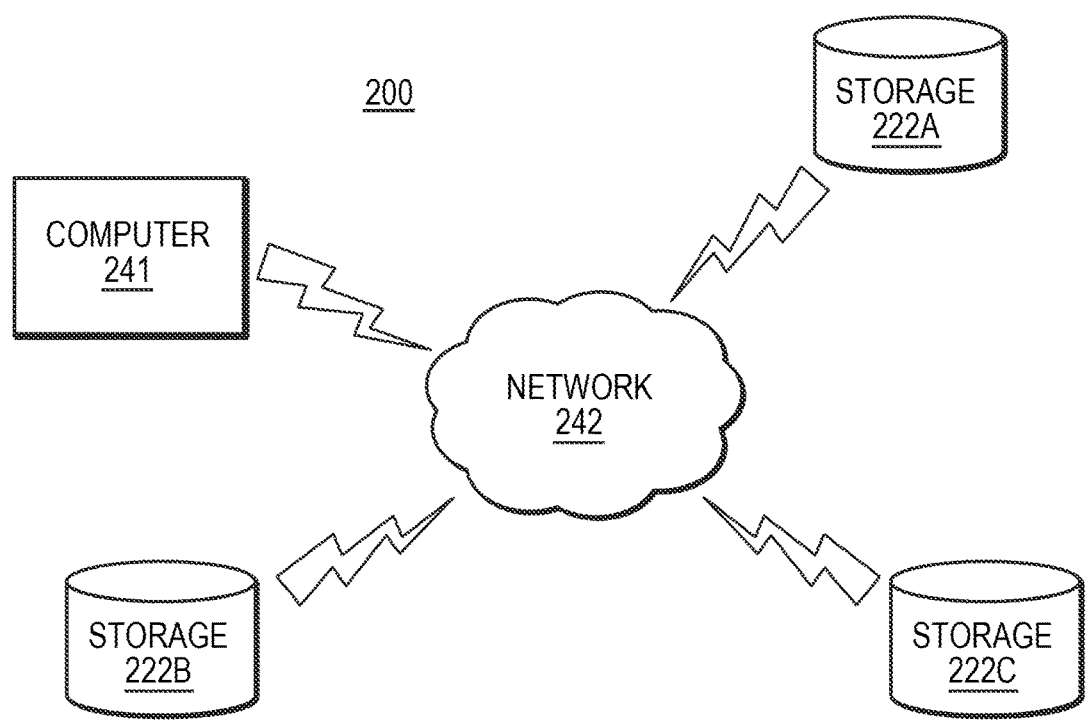
FIG. 2A is a schematic view of a computer network environment in which an embodiment of the present invention may be implemented.

FIG. 2A illustrates a computer network environment 200 in which an embodiment of the present invention may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody an Information Handling System (IHS) 320 (referring to FIG. 3 to follow) and/or any embodiment of the IHS described herein. Similarly, the computer 241 may be configured to carry out any method or embodiment thereof described herein. According to an embodiment of the invention, the computer 241 may be configured to estimate and control one or more QoS parameters (such as bandwidth and/or throughput) across the network 242 between the sets 222A, 222B, 222C of storage devices. While three sets 222A, 222B, 222C of storage devices are depicted, the computer network environment 200 may comprise any number of storage devices.

Figure 2B:
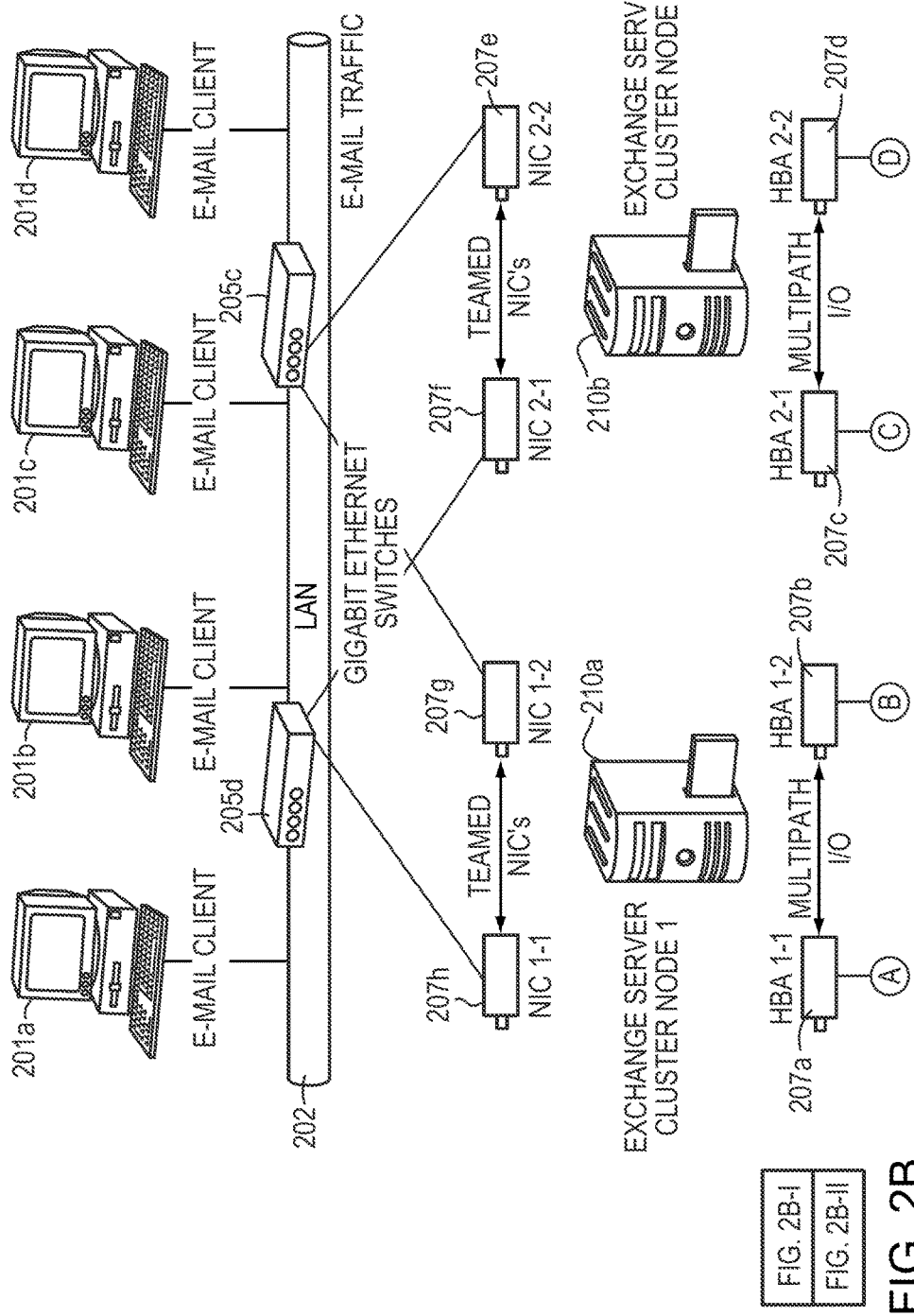
FIG. 2B (FIGS. 2B-I and 2B-II) is a block diagram view of another computer network environment in which an embodiment of the present invention may be implemented.

As illustrated in FIG. 2B, in one embodiment, the present invention may run on a network 201 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an internet protocol (IP) SAN. The SAN 203 may include components such as one or more servers 210a, 210b that communicate to one or more network switches 205a, 205b through a set of one or more network interface cards (NICs)

207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited, to, storage groups 221a, 221b and PS series data arrays 220a, 220b. The PS series group 222 may include a given set (referring to each of 222A, 222B, and 222C of FIG. 2A) of storage devices. In an alternative embodiment, the SAN 203 may be considered to include the LAN 202 and the above-mentioned components with which the LAN 202 communicates, in addition to the above-mentioned components with which the SAN 203 communicates.

Figure 3:
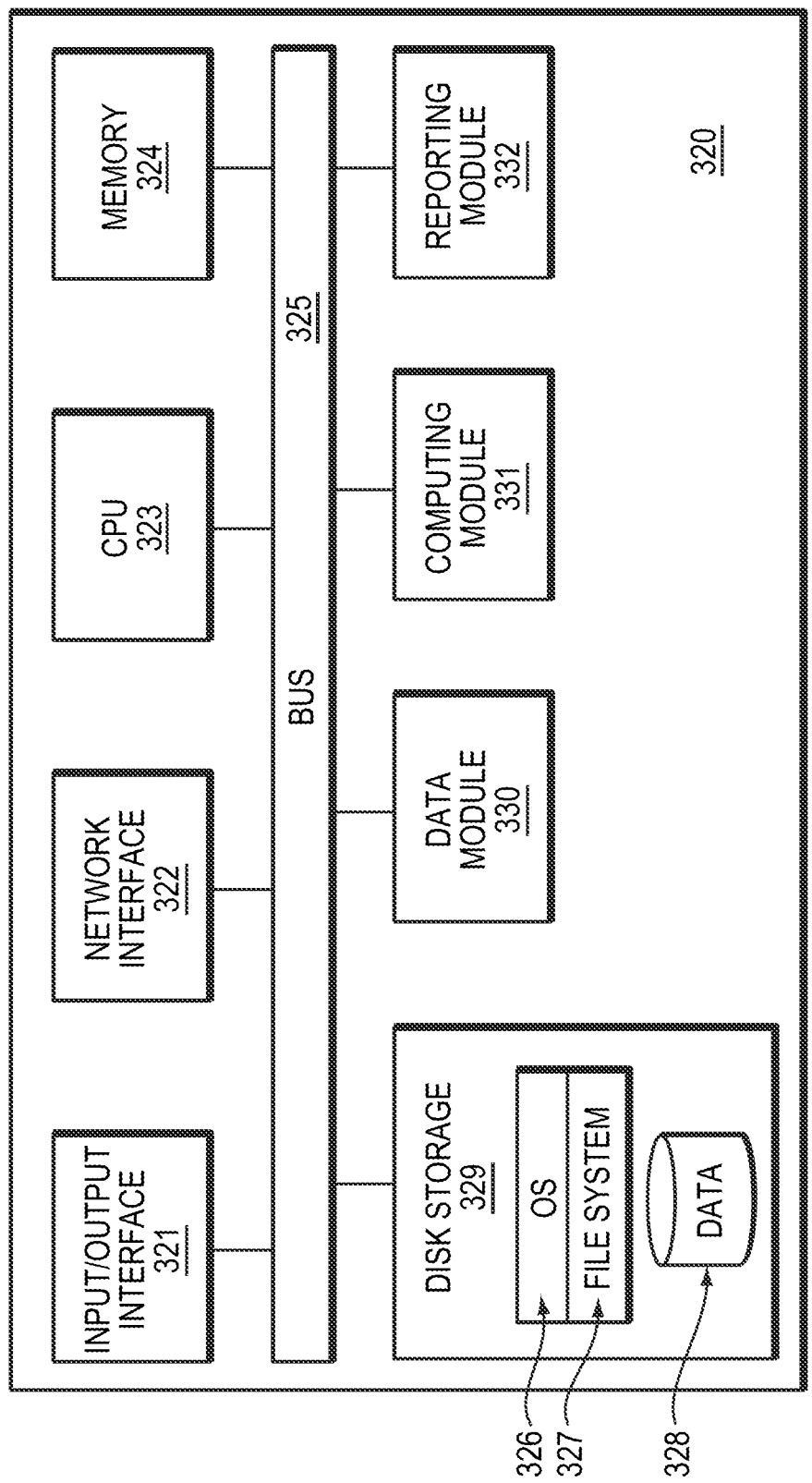
FIG. 3 is a simplified block diagram of an Information Handling System (IHS) in an embodiment of the present invention.

FIG. 3 is a high level block diagram of an information handling system (IHS) 320 that is configured to estimate and control QoS parameters in a storage area network according to the present invention. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

The IHS 320 comprises a computing module 331 including a first set of one or more storage devices 329. According to an embodiment of the IHS 320, the computing module 331 may be configured to create a given temporary volume. The temporary volume may be associated with a given set of at least one set of one or more storage devices. The given set may be located at the disk storage of another external machine accessible through the input/output interface 321 or the network 322 (or alternatively, the given set may be present locally in disk storage 329). The temporary volume may be present on local disk storage 329 or on disk storage of the external machine. The computing module 331 may be further configured to send a given sequential workload of actual traffic between a first set of one or more storage devices 329 and the given set. The computing module 331 may be further configured to estimate, based upon the results of sending the given sequential workload of actual traffic, one or more QoS parameters for the given set.

The IHS 320 may further comprise a reporting module 332 configured to report the one or more QoS parameters to a user. The IHS 320 may further comprise a data module 330 that may be configured to enable the user to modify the one or more QoS parameters. The data module 330 and/or computing module 331 and/or reporting module 332 may be communicatively coupled to each other as illustrated in FIG. 3.

The data module 330 may be further configured to control a data flow between the first set 329 and the given set. The data flow may be associated with the one or more QoS parameters that may be located in memory 324. The data module 330 may be further configured to copy given data stored at the first set 329 to the given set along the data flow. For example, the data module 330 may copy data to and/or from the storage device 329 or via the input/output interface 321 or network interface 322. The data module 330 may copy data to and/or from any communicatively coupled source, including, but not limited to, the computing module 331, the reporting module 332, the network 322, from the input/output interface 321, the memory 324, or disk storage 329.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or Operating System (OS) 326 operated on by CPU 323. Further, the IHS 320 and its various components and modules may be configured to operate in a manner corresponding to the above described method 100, described herein above in relation to FIG. 1 and its various embodiments.

Figure 4:
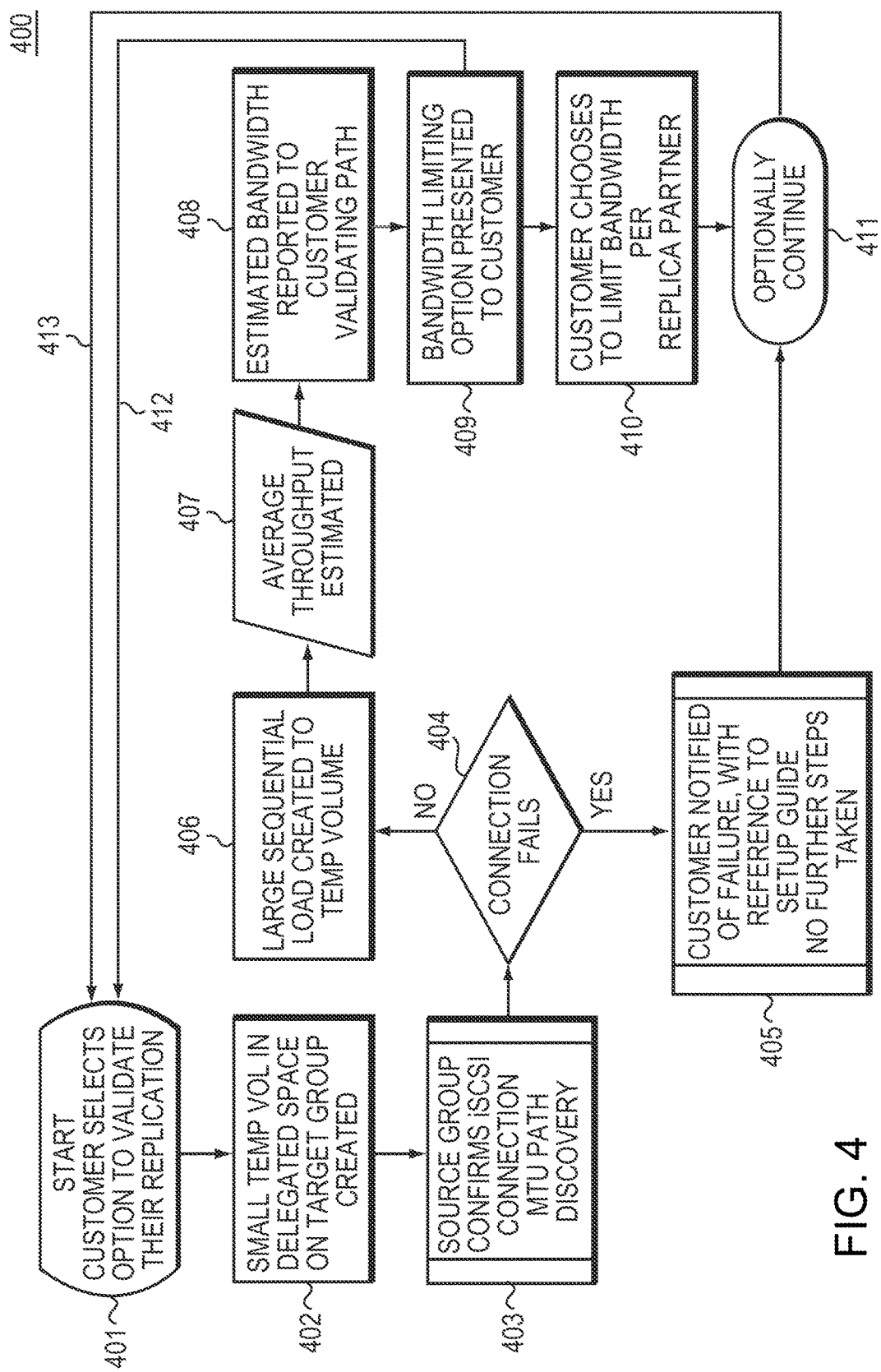
FIG. 4 is a flowchart of an embodiment of the present invention.

FIG. 4 illustrates another flowchart and/or computer-implemented procedure 400 of the method 100 of the present invention. A user (and/or customer) may select an option to validate the user's replication 401 between replica partners (e.g., between the first set and one or more given sets). Next, a temporary volume may be created 402 on the target group (given set). Next, the first set (source group) may confirm 403 the connection between the first group and the given set over the network. The connection may be made by way of a Serial Attached Small Computer System Interface (iSCSI) or other connection interface known in the art. The connection may be confirmed 403 through a maximum transmission unit (MTU) path discovery or through other means. The results of the connection confirmation are analyzed 404. If the connection between the first set and given set fails, then the customer is notified of the failure with reference to a setup guide 405, and recommendations may be provided for correcting the failed connection.

If the connection between the first set and given set succeeds, then a large sequential load of actual data may be created and sent 406 from the first set to the temporary volume that is associated with the given set. Alternatively, the actual data may be sent 406 from the temporary volume to the first set. Next, one or more QoS parameters, such as, but not limited to, average throughput and/or bandwidth, may be estimated 407 based upon the large sequential load of actual data. Next, the estimated bandwidth may be reported 408 to a user. Next, a bandwidth controlling option may be presented 409 to the customer, so that the customer may limit and/or control 410 the bandwidth.

Next, in one embodiment, the customer may choose to limit bandwidth 410 per given replica partner. For example, at step 409, the customer may choose to estimate bandwidth for at least one more replica partner 412 before proceeding to step 410. In one embodiment, a customer may limit bandwidth for one or more given replica partners in step 410. After limiting bandwidth 410 or after receiving the option to limit bandwidth 409, the customer may continue 411 the computer-implemented procedure 400 for the next given replica partner by restarting 413 the procedure 400.

Therefore, the customer may choose to estimate bandwidth 408 for the replica partners first, and then limit the bandwidth 410 for the replica partners. Alternatively, the customer may choose to estimate bandwidth 408 for a given replica partner, then limit bandwidth 410 for the given replica partner, and then estimate bandwidth 408 for the next replica partner and limit bandwidth 410 for the next replica partner, and so forth.

In one embodiment, up to sixteen replica partners may be supported, however, the present invention is not so limited. In other words, a first set and fifteen given sets may be supported, however, the present invention is not so limited. The QoS parameters (such as bandwidth and/or throughput) may vary between replica partners.

It should be understood that the example embodiments described above may be implemented in many different ways. In some instances, the various methods and machines described herein may be implemented by a physical, virtual or hybrid general-purpose computer, or a computer network environment such as the computer network environments 200, 201. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for estimating bandwidth and providing one or more Quality of Service (QoS) parameters between sets of one or more storage devices the method comprising:
   establishing a first connection between a first set of one or more storage devices of a storage area network (SAN) and a given set of storage devices external to the (SAN), and establishing a second connection between a second set of one or more storage devices of the storage area network (SAN) and the given set, the given set being formed of one or more storage devices external to the SAN, and the first and second sets of storage devices being different from each other;
   creating a first temporary volume on the given set, and creating a second temporary volume on the given set;
   sending across the established first connection a first sequential workload of actual traffic between the first set and the created first temporary volume on the given set, and sending across the established second connection a second sequential workload of actual traffic between the second set and the created second temporary volume on the given set; and
   estimating, based upon results of the sending of the first sequential workload of actual traffic and the sending of the second sequential workload of actual traffic, one or more Quality of Service (QoS) parameters for the given set,
   wherein the given set is among other sets of one or more storage devices, one of the other sets comprising at least a plurality of storage devices, and
   the estimating including providing a first user-controlled bandwidth threshold of the estimated one or more QoS parameters for the given set, the first user-controlled bandwidth threshold being applied between the first set and the given set, and providing a second user-controlled bandwidth threshold of the estimated one or more QoS parameters for the given set, the second user-controlled bandwidth threshold being applied between the second set and the given set.

2. The computer-implemented method of claim 1, further comprising:
   reporting the one or more QoS parameters to a user.

3. The computer-implemented method of claim 1, further comprising:
   enabling the user to modify the one or more QoS parameters; and
   controlling a first data flow between the first set and the given set, and controlling a second data flow between the second set and the given set, the first and second data flows being associated with the one or more QoS parameters.

4. The computer-implemented method of claim 3, further comprising:
   copying first data stored at the first set to the given set along the first data flow, and copying second data stored at the second set to the given set along the second data flow.

5. The computer-implemented method of claim 1, wherein the estimated one or more QoS parameters for the given set is different from one or more QoS parameters for at least one of the other sets of one or more storage devices.

6. The computer-implemented method of claim 1, wherein the actual traffic sent between the first set and the given set originates from the first set and the actual traffic sent between the second set and the given set originates from the second set.

7. An information handling system (IHS) comprising:
   at least one processor configured to implement:
   a computing module configured to establish a first connection between a first set of one or more storage devices of a storage area network (SAN) and a given set of one or more storage devices, the computing module configured to establish a second connection between a second set of one or more storage devices of the storage area network (SAN) and the given set, and the given set being formed of one or more storage devices external to the SAN, and the first and second sets of storage
devices being different from each other;

the computing module further configured to create a first
temporary volume on the given set and to create a
second temporary volume on the given set;

the computing module further configured to: (i) send
across the established first connection a first sequential
workload of actual traffic between the first set and the
created first temporary volume on the given set, and to
(ii) send across the established second connection a
second sequential workload of actual traffic between
the second set and the created second temporary volume on the given set; and the computing module further configured to estimate,
based upon results of the sending the first sequential
workload of actual traffic and the sending of the second
sequential workload of actual traffic, one or more
Quality of Service (QoS) parameters for the given set, wherein the given set is from among other sets of one or
more storage devices, and one of the other sets comprises at least a plurality of storage devices, and there being a first user-controlled bandwidth threshold of
the estimated one or more QoS parameters for the given
set, the first user-controlled bandwidth threshold being
applied between the first set and the given set, there
being a second user-controlled bandwidth threshold of
the estimated one or more QoS parameters for the given
set, the second user-controlled bandwidth threshold
being applied between the second set and the given set.

8. The IHS of claim 7, further comprising a reporting module configured to report the one or more QoS parameters to a user.

9. The IHS of claim 7, further comprising a data module configured to enabling the user to modify the one or more QoS parameters, the data module further configured to control a first data flow between the first set and the given set, and controlling a second data flow between the second set and the given set, the first and second data flows being associated with the one or more QoS parameters.

10. The IHS of claim 9, wherein the data module is further configured to copy first given data stored at the first set to the given set along the first data flow, the data module being further configured to copy second given data stored at the second set to the given set along the second data flow.

11. The IHS of claim 7, wherein the estimated one or more QoS parameters for the given set is different from the one or more QoS parameters for at least one of the other sets of one or more storage devices.

12. The IHS of claim 7, wherein the actual traffic sent between the first set and the given set originates from the first set and the actual traffic sent between the second set and the given set originates from the second set.

13. A non-transitory computer readable medium having stored thereon a sequence of instructions which, when loaded and executed by a processor coupled to an apparatus, causes the apparatus to:

establish a first connection between a first set of one or
more storage devices of a storage area network (SAN)
and a given set of one or more storage devices, the
computing module configured to establish a second
connection between a second set of one or more storage
devices of the storage area network (SAN) and the
given set, and the given set being formed of one or
more storage devices external to the SAN, and the first
and second sets of storage devices being different from
each other;

create a first temporary volume on the given set and to
create a second temporary volume on the given set;

(i) send across the established first connection a first
sequential workload of actual traffic between the first
set and the created first temporary volume on the given
set, and to (ii) send across the established second
connection a second sequential workload of actual
traffic between the second set and the created second
temporary volume on the given set; and estimate, based upon results of the sending the first
sequential workload of actual traffic and the sending of
the second sequential workload of actual traffic, one or
more Quality of Service (QoS) parameters for the given
set, wherein the given set is from among other sets of one or
more storage devices, and one of the other sets comprises at least a plurality of storage devices, and there being a first user-controlled bandwidth threshold of
the estimated one or more QoS parameters for the given
set, the first user-controlled bandwidth threshold being
applied between the first set and the given set, there
being a second user-controlled bandwidth threshold of
the estimated one or more QoS parameters for the given
set, the second user-controlled bandwidth threshold
being applied between the second set and the given set.

14. The computer-implemented method of claim 1, wherein the one or more Quality of Service (QoS) parameters include throughput and bandwidth.

15. The computer-implemented method of claim 1, wherein the first and second user-controlled bandwidth thresholds are different from each other.

16. The computer-implemented method of claim 1, wherein the established connection includes an Internet Small Computer System (iSCSI) connection.

17. The computer-implemented method of claim 1, further comprising:
verifying the established connection based upon maximum transmission unit (MTU) path discovery.

18. The computer-implemented method of claim 1, further comprising:
automatically notifying a failure of the established connection to a user.

* * * * *